US008508197B2

(12) United States Patent
Yoon et al.

(10) Patent No.: US 8,508,197 B2
(45) Date of Patent: Aug. 13, 2013

(54) STATIC COMPENSATOR AND METHOD FOR CONTROLLING THEREOF

(75) Inventors: Jong-Su Yoon, Daejeon (KR); Yong-Hak Kim, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 287 days.

(21) Appl. No.: 12/892,495

(22) Filed: Sep. 28, 2010

(65) Prior Publication Data

US 2011/0074367 A1  Mar. 31, 2011

(30) Foreign Application Priority Data

Sep. 30, 2009  (KR) .................. 10-2009-0093185

(51) Int. Cl.
*G05F 1/14* (2006.01)
(52) U.S. Cl.
USPC ........................................... 323/255
(58) Field of Classification Search
USPC .......... 323/205, 210–211, 255, 301, 355–356
See application file for complete search history.

(56) References Cited

U.S. PATENT DOCUMENTS

| | | | | |
|---|---|---|---|---|
| 4,918,393 A | * | 4/1990 | Yokosuka et al. | 329/318 |
| 5,734,257 A | * | 3/1998 | Schauder et al. | 323/207 |
| 5,798,634 A | * | 8/1998 | Terada et al. | 323/207 |
| 6,218,744 B1 | * | 4/2001 | Zahrte et al. | 307/64 |
| 6,680,602 B2 | * | 1/2004 | Iyoda et al. | 323/207 |
| 2006/0028185 A1 | * | 2/2006 | Hernandez et al. | 323/222 |

FOREIGN PATENT DOCUMENTS

| | | |
|---|---|---|
| JP | 11-289666 | 10/1999 |
| KR | 10-2004-0082586 | 9/2004 |
| KR | 10-0874853 | 12/2008 |

OTHER PUBLICATIONS

Korean Office Action, w/ English translation thereof, issued in Korean Patent Application No. KR 10-2009-0093185 dated Dec. 30, 2011.

* cited by examiner

*Primary Examiner* — Jue Zhang
*Assistant Examiner* — Henry Lee, III
(74) *Attorney, Agent, or Firm* — McDermott Will & Emery LLP

(57) ABSTRACT

The present invention relates to a static compensator and a method for controlling thereof, more particularly, to a static compensator including a transformer connected with a bus of a power system; an inverter operating according to a control signal and connected to the transformer in series; a tap changer changing turn ratio of the transformer; and a controller generating the control signal to operate the inverter and generating a tap up or a tap down signal to provide to the tap changer and a method for controlling thereof.

5 Claims, 6 Drawing Sheets

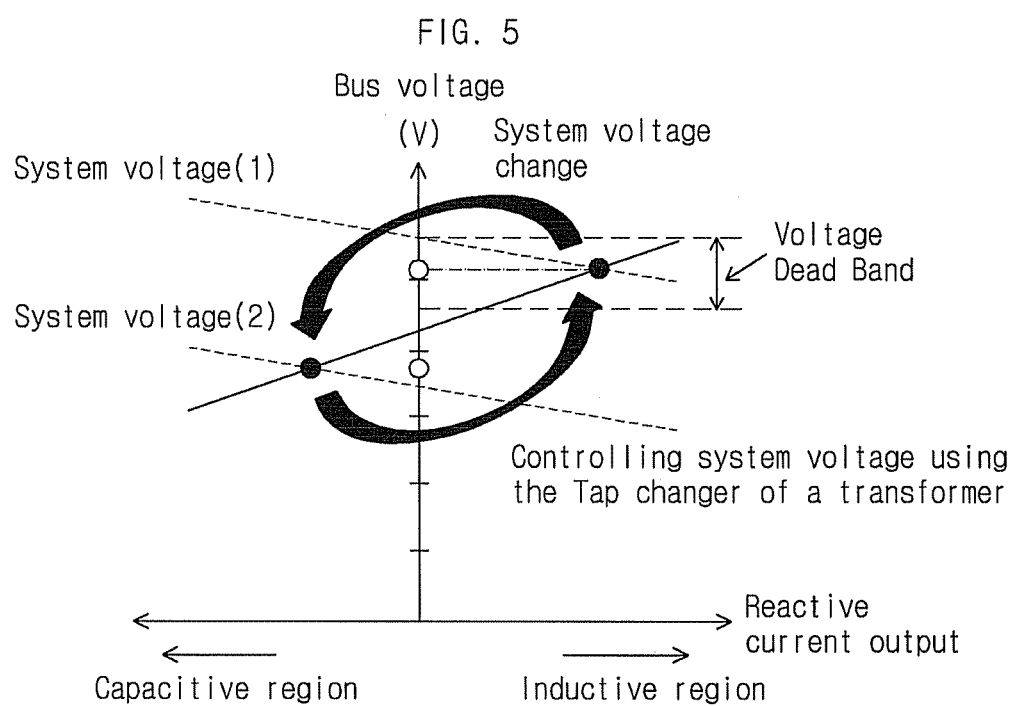

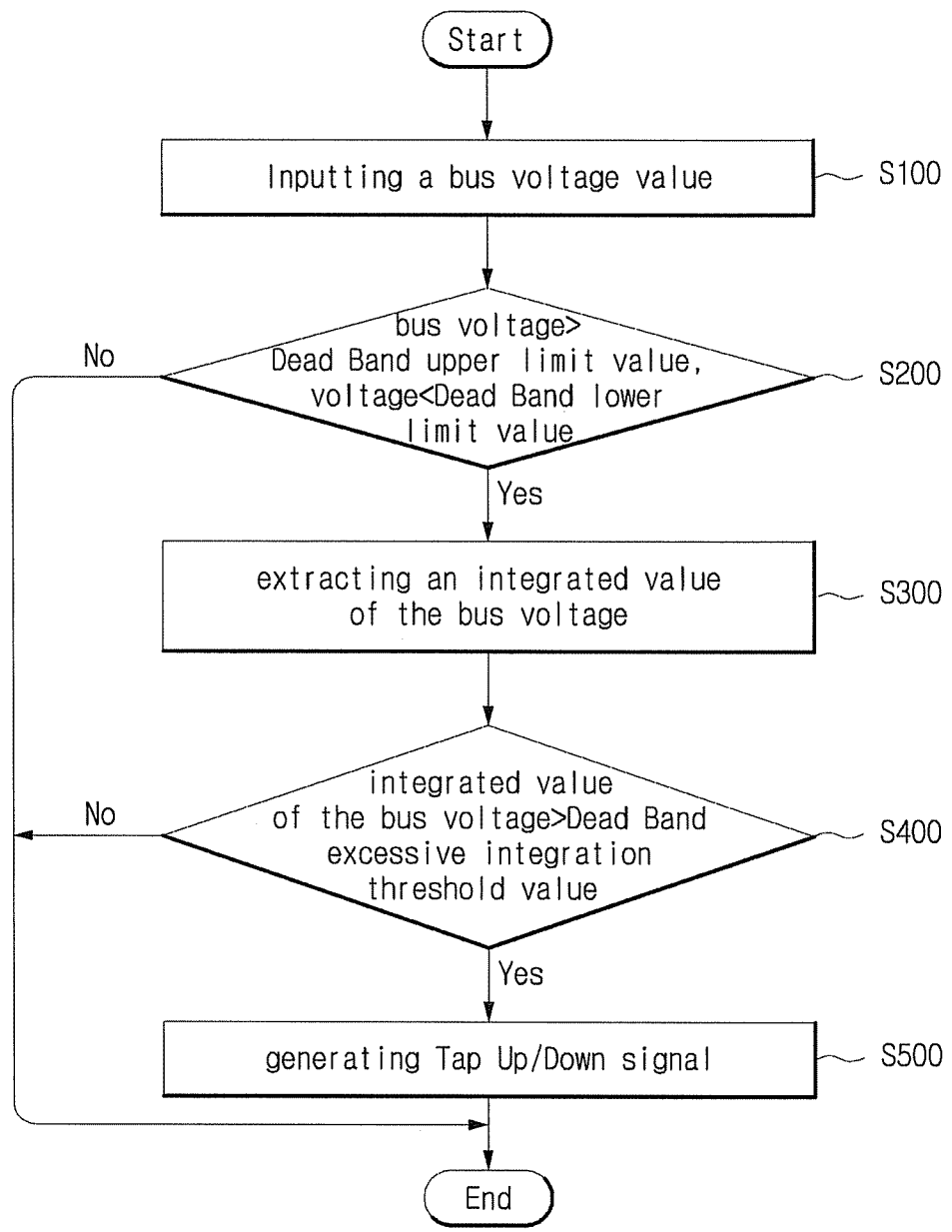

STATIC COMPENSATOR AND METHOD FOR CONTROLLING THEREOF

CROSS-REFERENCE TO RELATED APPLICATIONS

This application claims the benefit of Korean Patent Application No. 10-2009-0093185 filed on Sep. 30, 2009, with the Korea Intellectual Property Office, the contents of which are incorporated here by reference in their entirety.

BACKGROUND

1. Technical Field

The present invention relates to a static compensator and a method for controlling thereof.

2. Background

Voltage control of a general static compensator (STATCOM), which is a main function, is conducted by an output voltage control using an inverter itself. However, such a static compensator always has to have the capacity to control stabilization inside the static compensator in case of breakdown when it performs a stabilizing control function at the same time. It means that the performance of voltage control function of the static compensator causes a severe reduction in the capacity to control stabilization (reactive power output quantity).

A conventional static compensator has concentrated on operating for either automatic voltage control or power system stabilization control in accordance with characteristics of a power system. For example, if a power system has a problem of low voltage generation due to long-distance line or overload, a reactive power compensation function of a static compensator is emphasized. On the other hand, if a power system has a problem of voltage stability or transient stability, a power system stabilization function is emphasized in case of breakdown. Such problems limit the operation of a static compensator.

When the automatic voltage control of the static compensator is emphasized, it may have severe changes in the reactive power output margin quantity for an instantaneous stabilization control because it changes a reactive power output quantity to maintain a constant voltage of a power system.

On the other hand, when the stabilization control of a power system is emphasized, it is difficult for a static compensator to secure enough margin for a reactive power capacity to perform automatic voltage control of a power system and operate instantaneously in case of breakdown at the same time.

SUMMARY

An aspect of the invention is to provide a static compensator able to control a bus voltage of a power system by using a transformer equipped with a tap changer and a tap changer controller and a method for controlling thereof.

Another aspect of the invention is to provide a static compensator able to secure a reactive power margin of a power system by controlling an inverter using a voltage controller and a reactive current controller.

According to an embodiment of the invention, there is provided a static compensator including: a transformer connected with a bus of a power system; an inverter operating according to a control signal and connected to the transformer in series; a tap changer changing a turn ratio of the transformer; and a controller generating the control signal to operate the inverter and generating a tap up or a tap down signal to provide to the tap changer.

Here, the controller may include an reactive current controller and a voltage controller generating a control signal to operate the inverter; a tap changer controller generating the tap up signal and the tap down signal, wherein the tap changer controller extracts an integrated value of a bus voltage when the bus voltage inputted from the bus is higher or smaller than a predetermined reference and outputs the tap up signal or the tap down signal after comparing the extracted integrated value with a predetermined excessive integration threshold value.

Further, the tap changer controller may include: a first comparing unit comparing the bus voltage and the predetermined reference and generating an on or off signal; an integrator extracting an integrated value of the bus voltage; a timer positioned between the integrator and the first comparing unit and transmitting a time delay signal to the integrator when a signal is inputted from the comparing unit; and a second comparing unit comparing the integrated value with a excessive integration threshold value and outputting a tap up signal or a tap down signal.

The predetermined reference may be an upper limit or a lower limit of an operating voltage of the power system.

The voltage controller may calculate reactive power using a difference between the bus voltage and the predetermined voltage and provide the calculated first reactive current to the reactive current controller, and the reactive current controller may calculate voltage phase angle using a difference between the first reactive current and a predetermined reactive current and provide a phase angle of an output voltage of the inverter using the calculated voltage phase angle and a bus voltage phase angle.

According to another embodiment of the invention, there is provided a method for controlling a static compensator including:

(a) inputting a bus voltage of a power system;
(b) comparing the bus voltage with a predetermined reference;
(c) extracting an integrated value by integrating the bus voltage when the bus voltage is higher than the reference;
(d) comparing the extracted integrated value with a predetermined excessive integration threshold value; and
(e) providing a tap up signal to a tap changer of a transformer when the integrated value is equal to or higher than the excessive integration threshold value to change a turn ratio of the transformer.

Here, in the step (c), the reference is an operating voltage upper limit of the power system.

According to another embodiment of the invention, there is provided a method for controlling a static compensator including:

(a) inputting a bus voltage of a power system;
(b) comparing the bus voltage with a predetermined reference;
(c) extracting an integrated value by integrating the bus voltage when the bus voltage is smaller than the reference;
(d) comparing the extracted integrated value with a predetermined excessive integration threshold value; and
(e) providing a tap down signal to a tap changer of a transformer when the integrated value is equal to or higher than the excessive integration threshold value to change a turn ratio of the transformer.

Here, in the step (c), the reference is an operating voltage lower limit of the power system.

The static compensator according to the present invention allows performing both stabilization control in case of breakdown of a power system and voltage control of a power system at the same time.

Further, the static compensator according to the present invention allows easily securing reactive power margin for the stabilization of a power system.

BRIEF DESCRIPTION OF THE DRAWINGS

FIG. 5 is a graph illustrating operating point changes of a static compensator when a bus voltage of a power system changes.

FIG. 6 is a flowchart illustrating a method for controlling a static compensator according to an embodiment of the invention.

DESCRIPTION OF REFERENCE NUMBERS

| | |
|---|---|
| 100: controller | 110, 170: D/Q changing unit |
| 120: intensity calculating unit | 130, 180: PI controller |
| 140: drop controller | 150, 190: upper/lower limit limiter |
| 200: Tap changer | 210: first comparing unit |
| 220: first timer | 230: first integrator |
| 240: second comparing unit | 250: third comparing unit |
| 260: second timer | 270: second integrator |
| 280: fourth comparing unit | 400: transformer |
| 500: bus | 600: inverter |
| 700: capacitor | |

DETAILED DESCRIPTION

While the present invention has been described with reference to particular embodiments, it is to be appreciated that various changes and modifications may be made by those skilled in the art without departing from the spirit and scope of the present invention, as defined by the appended claims and their equivalents. Throughout the description of the present invention, when describing a certain technology is determined to evade the point of the present invention, the pertinent detailed description will be omitted.

While such terms as "first" and "second," etc., may be used to describe various components, such components must not be limited to the above terms. The above terms are used only to distinguish one component from another.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

The present invention will be described below in more detail with reference to the accompanying drawings, in which those components are rendered the same reference number that are the same or are in correspondence, regardless of the figure number, and redundant explanations are omitted.

Figure 1:
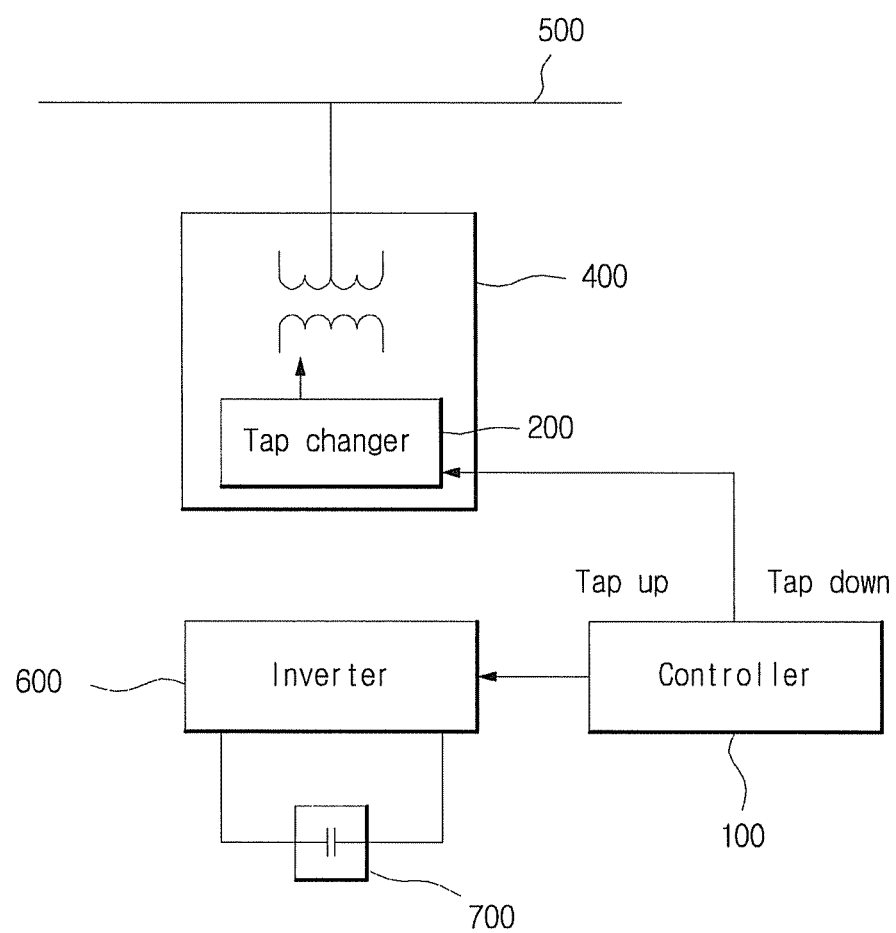
FIG. 1 is a schematic block diagram illustrating a static compensator according to an embodiment of the invention.

FIG. 1 is a schematic block diagram illustrating a static compensator according to an embodiment of the invention.

According to FIG. 1, a static compensator may include a transformer 400, an inverter 600, a capacitor 700 and a controller 100, wherein the transformer 400 may further include a tap changer 200.

In particular, the transformer 400 may convert a high voltage of a system to a low voltage (high current), which the inverter 600 allows, and provide an impedance (reactance) so that a static compensator is able to conduct a voltage control. The transformer 400 may reduce harmonics of an output voltage of the inverter 600 by using $^{\Delta}$winding wire (coil) or particular combination functions of winding wire (coil).

The tap changer 200 may receive a tap up/down signal and change a turn ratio of the transformer 400 according to the received signal.

The inverter 600 may control a power system and a voltage intensity of the same phase. The inverter 600 may conduct pulse output using firing angle control and a plurality of inverters may be connected in series to improve output quality.

The controller 100 may control a voltage of the inverter 600 by employing reactive current output quantity control and phase angle control, and provide a tap up/down signal to control the tap changer 200 of the transformer 400.

The controller 100 will be more particularly described with reference to FIG. 2 to FIG. 5.

Figure 2:
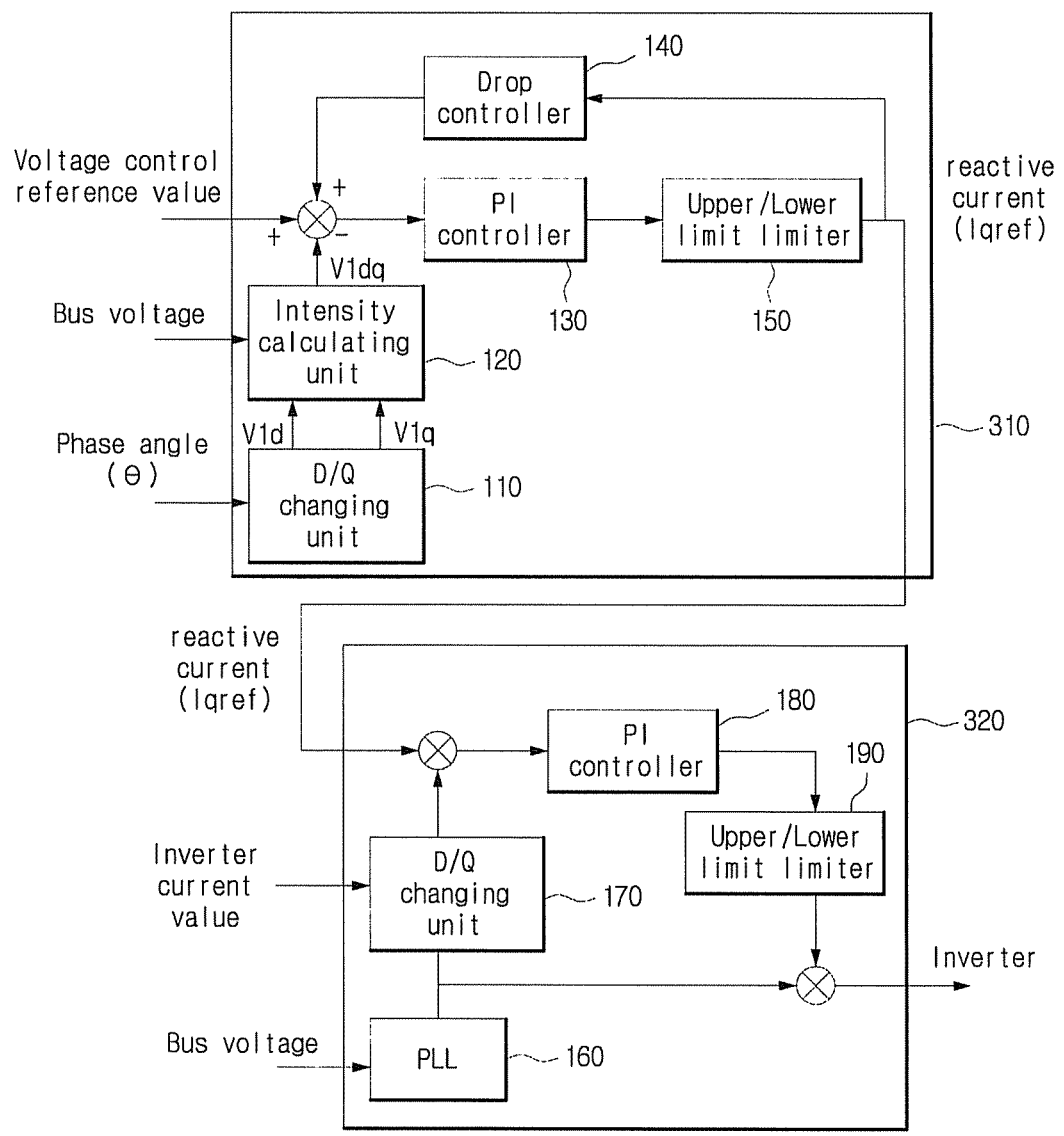
FIG. 2 is a block diagram illustrating a voltage controller and a reactive current controller of the static compensator in FIG. 1.

FIG. 2 is a block diagram illustrating a voltage controller and a reactive current controller of the controller in FIG. 1.

According to FIG. 2, a voltage controller 310 may control output quantity of reactive current (Iqref) according to a voltage control reference value (Vref) determined by a user. For this purpose, the voltage controller 310 may include a D/Q changing unit 110, an intensity determining unit 120, a PI controller 130, a drop controller 140 and an upper/lower limit limiter 150.

The D/Q changing unit 110 may convert to 2 phase signal of active power and reactive power by receiving phase angle (θ) of the 3 phase bus voltage from a PLL 160. For example, when a power system is 3 phase of A, B, C, the 3 phase is converted to 2 phase signal by using a d-q axis through the D/Q changing unit 110 since it is difficult to control 3 phase.

The intensity calculating unit 120 may output the bus voltage (V1$dq$) by using a bus voltage inputted from a bus of a power system and the active voltage (V1$d$) and the reactive voltage (V1$q$) inputted from the D/Q changing unit 110.

A collective name of an improper integral compensator, a proportional integral controller and the like is the PI controller 130. The PI controller 130 may compensate a difference between the voltage control reference value (Vref) and the bus voltage (V1$dq$), and control output quantity of the reactive current.

The drop controller 140 may present control performance sensitivity of the PI controller 130. For example, if a drop value is 0, the PI controller 130 may operate sensitively. However, because a capacity of a static compensator is limited, a drop value may be set for about 1% so that performance and capacity may be properly selected.

The upper/lower limit limiter 150 may output the maximum value and the minimum value of the reactive current output quantity inputted from the PI controller 140 by limiting to be within a predetermined range.

The reactive current controller 320 may include a D/Q changing unit 170, a PLL 160, a PI controller 180 and an upper/lower limit limiter 190.

The PLL 160 may be used for a synchronous control since it operates by synchronizing a voltage waveform of a power system and a static compensator.

The D/Q changing unit 170 may convert an inverter current value of 3 phase to a current of 2 phase, calculate a reactive current value and output the result.

The PI controller 180 may output a voltage phase angle by inputting a difference between a reactive current (Iqref) inputted from the voltage controller 310 and a reactive current inputted from the D/Q changing unit 170.

A phase angle of an inverter output voltage may be outputted by synthesizing the voltage phase angle outputted from the PI controller 180 and the bus voltage phase angle outputted from the PLL 160.

Since the inverter 600 is controlled by the voltage controller 310 and the reactive current controller 320, when disturbance occurs, a power system may be stabilized by outputting a reactive power.

Figure 3:
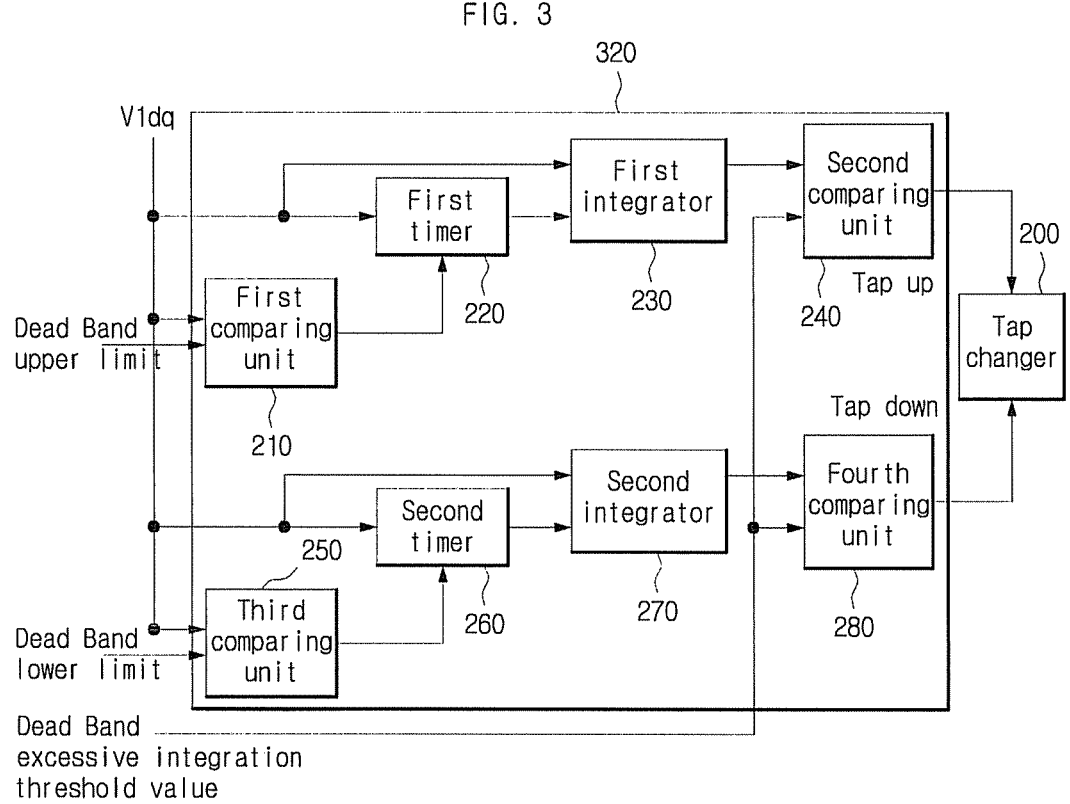
FIG. 3 is a block diagram illustrating a tap changing controller of the static compensator in FIG. 1.
Figure 4:
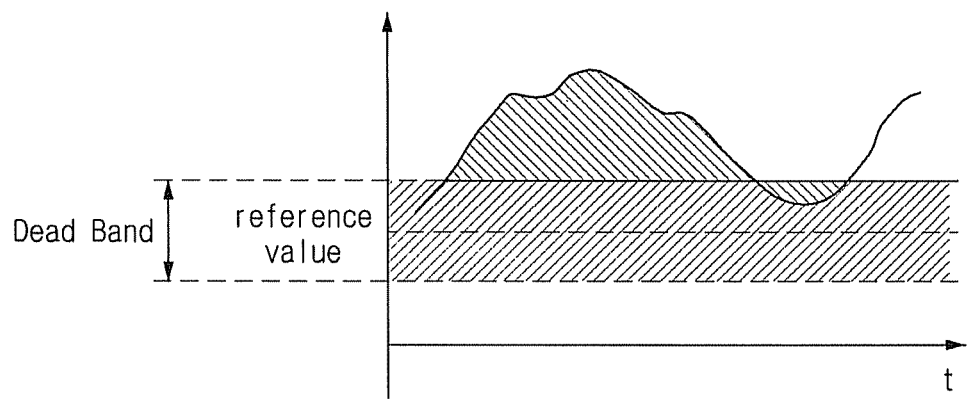
FIG. 4 is a graph illustrating a voltage Dead Band and an integration interval of a bus voltage during outputting bus voltage

FIG. 3 is a block diagram illustrating a tap changing controller of the static compensator in FIG. 1.

The tap changer controller 320 may generate a tap up/down signal when a bus voltage exceeds a dead band value. The tap changer 200 may control the bus voltage by changing a turn ratio of the transformer employing the tap up/down signal.

The tap changer controller 320 may include a first comparing unit 210, a first integrator 230, a first timer 220, a second comparing unit 240, a third comparing unit 250, a second timer 260, a second integrator 270 and a fourth comparing unit 280.

The first comparing unit 210 may output 0 or 1 indicating off or on by comparing a bus voltage (V1$d$) with a Dead Band upper limit. The first comparing unit 210 may transmit 0 or 1 to the first timer 220. Here, the first comparing unit 210 may compare the bus voltage (V1$dq$) with the Dead Band upper limit and then output 1 if the bus voltage (V1$dq$) is higher than the Dead Band upper limit and do 0 in the rest cases.

The first timer 220 may determine a time delay time of the first integrator 230 when 0 or 1 signal is inputted from the first comparing unit 210. For example, when the first timer 220 receives a signal of 1 from the first comparing unit 220, the first integrator 230 may transmit a time delay signal to integrate the inputted bus voltage after a certain time delay.

Thus, it may prevent from causing any problem to the tap changer 200 by avoiding operation of the tap changer 200 right after the bus voltage exceeds the Dead Band value.

The first integrator 230 may integrate the inputted bus voltage to extract an integrated value of the bus voltage. That is, the first integrator 230 may extract an integrated value of the bus voltage by integrating shown in FIG. 4. The integrated value of the bus voltage extracted from the first integrator 230 may be then transmitted to the second comparing unit 240.

The second comparing unit 240 may compare the integrated value of the bus voltage inputted from the first integrator 230 with a predetermined Dead Band excessive integration threshold value to generate a tap up signal. For example, the second comparing unit 240 may generate and provide a tap up signal if the integrated value of the bus voltage is higher than the predetermined Dead Band excessive integration threshold value to the tap changer 200.

The third comparing unit 250 may compare the bus voltage (V1$dq$) and a Dead Band lower limit to generate 0 or 1. The value of 0 or 1 generated from the third comparing unit 250 may be provided to the second timer 260. Here, 0 indicates that the second timer 260 does not operate and 1 indicates that the second timer 260 operates.

Here, the third comparing unit 250 may compare the bus voltage with a Dead Band lower limit. The third comparing unit 250 may output 1 if the bus voltage is smaller than the Dead Band lower limit, and 0 in the rest cases. However, on the contrary to this, the third comparing unit 250 may also output 0 if the bus voltage is smaller than the Dead Band lower limit and 0 in the rest cases.

The second timer 260 may delay the operation of the second integrator 270 for a predetermined time when the signal of 0 or 1 is inputted from the third comparing unit 250. For example, the second timer 260 may transmit a time delay signal to delay the operation of the second integrator 270 to the second integrator 270 if 1 is inputted.

Thus, it may prevent from causing any problem to the tap changer 200 by avoiding operation of the tap changer 200 right after the bus voltage exceeds the Dead Band value.

The second integrator 270 may integrate a bus voltage to extract an integrated value and transmit the extracted integrated value to the fourth comparing unit 280.

The fourth comparing unit 280 may generate a tap down signal if the integrated value of the bus voltage is higher than the Dead Band excessive integration threshold value and transmit the tap down signal to the tap changer 200 of the transformer.

The tap changer 200 may receive the tap up/down signal to change a turn ratio of the transformer by operating an internal switch and the like.

FIG. 5 is a graph illustrating operating point changes of a static compensator when a bus voltage of a power system changes.

As shown in FIG. 5, when a system voltage(1) state of a power system voltage is changed to a system voltage(2) state, an allowable reactive current output quantity for controlling stabilization of a static compensator may be changed. The allowable reactive current output quantity for controlling stabilization of a static compensator may be then recovered by controlling a system voltage to be within the voltage Dead Band using the tap changer controller.

FIG. 6 is a flowchart illustrating a method for controlling a static compensator according to an embodiment of the invention.

A method for controlling a static compensator according to FIG. 6 may include: inputting a bus voltage S100; comparing the bus voltage with a dead band upper/lower limit S200; extracting an integrated value of the bust voltage when the bus voltage is higher than the dead band upper/lower limit S300; comparing the extracted integrated value with a dead band excessive integration threshold value S400; and generating a tap up/down signal when the integrated value is higher than the dead band excessive integration threshold value S500.

Particularly, a bus voltage may be inputted from a bus of a power system in the step of inputting a bus voltage S100. Here, the step of inputting a bus voltage may further include converting the bus voltage inputted in 3 phase to an active voltage and a reactive voltage of 2 phase by using a D/Q changing unit.

The inputted bus voltage and a predetermined Dead Band upper limit or lower limit may be compared in the step of comparing the bus voltage with a dead band upper/lower limit S200.

When the bus voltage is higher than the Dead Band upper limit, an integrated value of the bus voltage may be extracted S300.

Here, the integrated value of the bus voltage may be extracted after a certain period of delayed time to protect the tap changer.

The integrated value of the bus voltage and a predetermined Dead Band excessive integration threshold value may be compared at the second comparing unit in the step of comparing the extracted integrated value with a dead band excessive integration threshold value S400.

When the integrated value of the bus voltage is higher than the predetermined Dead Band excessive integration threshold value, a tap up signal may be generated and the generated tap up signal may be then transmitted to the tap changer S500.

A turn ratio of the transformer may be then controlled by changing an internal switch and the like employing the tap up signal received from the tap changer.

On the other hand, when the bus voltage is smaller than the Dead Band lower limit in the step of comparing the bus voltage with a dead band upper/lower limit S200, an integrated value of the bus voltage may be extracted S300.

Further, when the integrated value of the bus voltage is higher than the predetermined Dead Band excessive integration threshold value, a tap down signal may be generated and the generated tap down signal may be then transmitted to the tap changer.

A turn ratio of the transformer may be then controlled by changing an internal switch and be like employing the tap down signal received from the tap changer.

As described above, the static compensator of the present invention stabilizes voltage of a power system by controlling a tap changer of a transformer for an operation point of the static compensator to be within the dead band.

While it has been described with reference to particular embodiments, it is to be appreciated that various changes and modifications may be made by those skilled in the art without departing from the spirit and scope of the embodiment herein, as defined by the appended claims and their equivalents.

What is claimed is:

1. A static compensator comprising:
   a transformer connected with a bus of a power system;
   an inverter operating according to a control signal and connected to the transformer in series;
   a tap changer changing turn ratio of the transformer;
   a voltage controller controlling an output quantity of a reactive current according to a predetermined voltage control reference value;
   a reactive current controller controlling a phase angle of an output voltage of the inverter using a difference in values between a reactive current inputted by the voltage controller and a reactive current measured by the inverter; and
   a tap changer controller extracting an integrated value of a bus voltage if the bus voltage inputted from the bus and the reactive current controller is greater or smaller than a predetermined reference value, comparing the extracted integrated value with a predetermined excessive integration threshold value, and outputting any of a tap up signal or a tap down signal controlling the tap changer,
   wherein the voltage controller comprises: a first D/Q changing unit receiving the bus voltage and converting the bus voltage into and outputting an active voltage of the bus voltage and a reactive voltage of the bus voltage; an intensity calculating unit outputting a bus voltage by using an active power and a reactive power from the D/Q changing unit; and a first PI controller controlling an output quantity of the reactive current by compensating a difference between the predetermined voltage control reference value and the bus voltage outputted from the intensity calculating unit, and
   wherein the tap changer controller comprises: a first comparing unit generating an ON or OFF signal by comparing the bus voltage with the predetermined reference value; an integrator extracting an integrated value of the bus voltage; a timer placed between the integrator and the first comparing unit and transmitting a time delay signal to the integrator if the ON signal is received from the comparing unit; and a second comparing unit outputting the tap up or tap down signal by comparing the integrated value with the excessive integration threshold value.

2. The static compensator of claim 1, wherein the voltage controller further comprises an upper/lower limit limiter outputting a reactive current output quantity inputted from the PI controller within a predetermined range.

3. The static compensator of claim 1, wherein the reactive current controller comprises:
   a second D/Q changing unit converting an inverter current value of 3 phase inputted from the inverter to a current of 2 phase and calculating and outputting a reactive current value; and
   a second PI controller outputting a voltage phase angle by using a difference between a reactive current inputted from the voltage controller and a reactive current inputted from the second D/Q changing unit.

4. The static compensator of claim 1, wherein the predetermined reference is an upper limit or a lower limit of an operating voltage of the power system.

5. The static compensator of claim 1, wherein the voltage controller calculates reactive power using a difference between the bus voltage and the predetermined voltage and provides the calculated first reactive current to the reactive current controller,
   and the reactive current controller calculates a voltage phase angle using a difference between the first reactive current and a predetermined reactive current and provides a phase angle of an output voltage of the inverter using the calculated voltage phase angle and a bus voltage phase angle.

* * * * *